United States Patent
Peterson

[11] Patent Number: 5,988,110
[45] Date of Patent: Nov. 23, 1999

[54] PET ENCLOSURE WITH WASTE TRAY

[76] Inventor: R. Dale Peterson, 5000 Cahaba Valley Trace, Birmingham, Ala. 35242

[21] Appl. No.: 09/027,945

[22] Filed: Feb. 23, 1998

[51] Int. Cl.[6] ............................................ A01L 31/07
[52] U.S. Cl. ............................ 119/453; 119/454; 119/479
[58] Field of Search .................................... 119/496, 482, 119/481, 480, 432, 479, 458, 462, 485, 452, 453, 464, 752, 417

[56] References Cited

U.S. PATENT DOCUMENTS

| | | | |
|---|---|---|---|
| 324,704 | 8/1885 | Kaiser | 119/462 |
| 1,151,865 | 8/1915 | Clippinger | 119/479 |
| 1,733,382 | 10/1929 | McCurdy | 119/458 |
| 1,863,982 | 6/1932 | Hatch | 119/458 |
| 2,175,754 | 10/1939 | Harrison | 43/58 |
| 3,399,654 | 9/1968 | Schroer | 119/752 |
| 3,429,297 | 2/1969 | Schroer | 119/417 |
| 3,618,568 | 11/1971 | Breeden | 119/482 |
| 4,171,683 | 10/1979 | Godin | 119/482 |
| 4,334,501 | 6/1982 | McDaniel et al. | 119/482 |
| 4,966,097 | 10/1990 | Rosenberger | 119/482 |
| 5,335,617 | 8/1994 | Hoffman | 119/479 |
| 5,435,266 | 7/1995 | Carson | 119/464 |
| 5,749,589 | 5/1998 | Hopkins et al. | 280/47.34 |

FOREIGN PATENT DOCUMENTS

| | | | |
|---|---|---|---|
| 00165359B | 6/1972 | Netherlands | 119/496 |

Primary Examiner—Peter M. Poon
Assistant Examiner—Judith A. Nelson
Attorney, Agent, or Firm—Robert J. Veal; Kenneth M. Buxh; Veal & Bush, LLC

[57] ABSTRACT

A pet enclosure and waste tray system includes a rectilinear cage, an detachably integrated waste pan removably attached to the bottom portion of the cage, a molded waste tray into which the combination cage and waste pan may be nested, and a dolly upon which the waste tray securely fits. The rectilinear cage has a movable rectilinear section capable of being swung up and away from the cage to facilitate removal of enclosed pets. Nesting material may be introduced into the waste pan which supports and is spaced from the bottom portion of the cage. Due to the proximity of the waste pan to the wire mesh of the bottom of the cage, the nesting material penetrates the cage for the occupant's use. A continuous shoulder along the inside of the waste tray is dimensioned such that the cage is supported by the shoulder when nested within the waste tray. The waste tray has a downwardly curled upper lip receivable on railings extending upward from the dolly to securely support the tray-pan-cage combination. During cleaning of the waste pan, the cage without the nesting material and pan may be securely placed within the waste tray, which can then be easily cleaned. The interior edges below the internal shoulder of the waste tray are smoothly and gradually curved to facilitate cleaning.

12 Claims, 4 Drawing Sheets

PET ENCLOSURE WITH WASTE TRAY

FIELD OF THE INVENTION

The present invention relates generally to animal enclosures. In particular, the invention relates to rectilinear animal cages having removable, nested, waste trays positioned below the cage to catch animal waste and facilitate cleaning.

BACKGROUND OF THE INVENTION

Rectangular wire cages are a favorite among pet owners because they are relatively easy to clean and permit a high degree of visibility of and for the cage occupant. Waste from the enclosed pet passes easily through the bottom of a wire cage so that the cage is kept clean, and various types of feeding and amusement devices may be easily affixed to the inside of the cage.

Most animal cages have a sliding or swing door permitting ingress and egress of the enclosed animal. Typically, the wire doors are small relative to the overall size of the cage, making it difficult to access the animal within the enclosure. Removal of the animal from the cage becomes an opportunity for the animal to be injured if the animal thrashes about while attempting its extraction or while attempting to place it within the cage.

Most pet cages include a waste tray which is permanently incorporated into the bottom of the animal cage or, alternatively, the cage is without an integral tray and the animal waste simply passes through the cage interstices onto a waste platform, such as newspaper or other absorbent material. However, most animals prefer to have nesting material for sleeping, resting, and rearing of young. The presence of nesting material complicates the cleaning procedure of a pet cage. When placed inside a wire cage, nesting material tends to collect the waste material from the enclosed animal forcing the animal owner to periodically extract the animal and thoroughly clean the interior of the cage. Nesting material must be periodically removed to hinder the spread of animal parasites and diseases. Removal of the nesting material and cleaning of the interior of a pet cage is a messy undertaking and presents a potential for injury of the animal or, potentially, the animal's owner.

Therefore, there exists a need for a system waste trays to facilitate the cleaning of a pet enclosure.

SUMMARY OF THE INVENTION

It is the object of the present invention to provide a rectilinear movable opening on a reticular wire cage to facilitate the extraction of an enclosed animal.

Another object of the present invention is to provide a detachable waste pan below the reticular cage for the introduction of nesting material into the waste pan area such that an animal may utilize the nesting material extending through the bottom of the cage.

A further object of the present invention is to provide a waste tray into which the combination cage and waste pan may be seated.

Yet another object of the invention is to provide a combination dolly, waste tray, waste pan, and cage for easy transportation of self contained waste tray, pan, and cage combination to a desired location.

Briefly, the invention includes 4 main components: a rectilinear cage; a detachably integrated waste pan positioned on the bottom portion of the cage; a molded waste tray into which the combination cage and waste pan may be nested; and a dolly upon which the waste tray securely fits. The rectilinear cage has a movable rectilinear door section capable of being swung up and away from the cage to facilitate removal of the animal. The waste pan is spaced from the bottom wire of the cage by a rectilinear "L" bracket so that nesting material may be introduced into the waste pan and not unduly compressed. The waste pan portion is biased against the bottom portion of the cage by two side springs attached to the cage on opposite sides of the pan. Due to the proximity of the waste pan to the bottom cage wire mesh, the nesting material penetrates the bottom of the cage for the animal's use. The waste pan-cage combination is positioned within the waste tray in a nested manner. A continuous shoulder along the inside of the waste tray is dimensioned such that the waste pan-cage combination is securely supported by the shoulder when placed within the waste tray. The waste tray also has a downwardly curled upper lip so that railings along the upper portion of the dolly securely support the tray-pan-cage combination. During cleaning of the waste pan, the cage without the nesting material and pan may be placed within the waste tray while the waste pan is cleaned. The interior edges below the internal shoulder of the waste tray are smooth and gradually curved to facilitate cleaning.

Other features and objects and advantages of the present invention will become apparent from a reading of the following description as well as a study of the appended drawings.

BREIF DESCRIPTION OF THE DRAWINGS

A pet enclosure and waste tray system incorporating the features of the invention is depicted in the attached drawings which form a portion of the disclosure and wherein:

FIG. 1 an exploded perspective view of the components of the pet enclosure and waste tray system;

DESCRIPTION OF THE PREFERRED EMBODIMENTS

Figure 1:
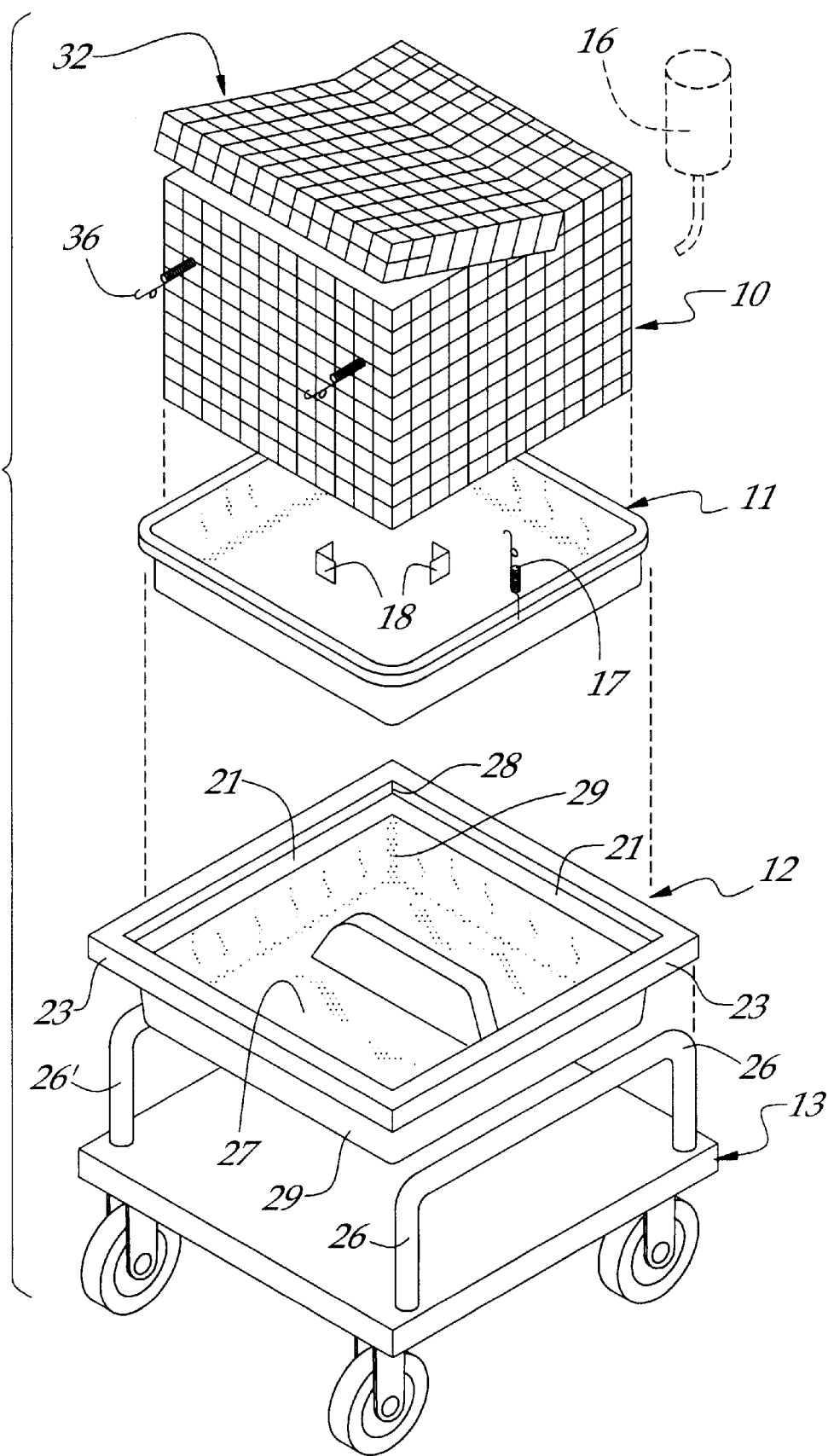

Referring to the drawings for a better understanding of the function and structure of the invention, FIG. 1 shows the rectilinear cage 10, the waste pan 11, the waste tray 12, and the movable dolly 13 in a relational exploded view. The cage 10 consists of a rectilinear wire mesh cage having various types of feeding and amusement features 16 affixed tq the interior or exterior of the cage mesh. As shown in FIG. 1, the waste pan 11 is dimensioned to closely fit over bottom portion of the cage 10 and has upstanding side walls integrally formed about its periphery. The side walls extend to a height sufficient to serve as a spray guard to prevent discharge of animal body fluids outwardly from the cage area. Biasing springs 17,17' are connected to curved upper lip of the waste pan and to one of the wires of the cage to bias the pan against the bottom of the cage. A wire spacing bracket 18, which may be a rectilinear L-shape as shown, affixed to the bottom of the pan and acts as spacing and support member for the bottom 19 of the cage. The bracket 18 acts to support cage 10 a predetermined distance from the floor of the pan 11 to allow for nesting material to be placed in the pan underneath the cage bottom 19. As the cage is lowered onto the pan 11, the nesting material protrudes through the wire bottom 19 for use by the enclosed animal.

The waste tray 12 is sized to receive the waste pan-cage combination in a nested arrangement. A continuous shoulder 21 is molded into the interior of the waste tray 12 and is positioned to support the periphery of the bottom of the waste pan-cage combination. A center support stop 22 assists the shoulder 21 in supporting the middle of the pan-cage combination. As shown, the waste tray 12 includes a downwardly extending outer lip 23 cooperatively sized with upstanding rails 26 of dolly 13. As the waste tray 12 is lowered onto the dolly rails 26, the rails contact the inner surface of the lip 23 which is shaped to conform to the rounded railing and with the added weight of the waste pan-cage combination, the waste tray 12 is held securely on the dolly 13. The adjacent lips 23 on adjacent walls prevent longitudinally travel of the waste tray 12 along the railing.

Figure 2:
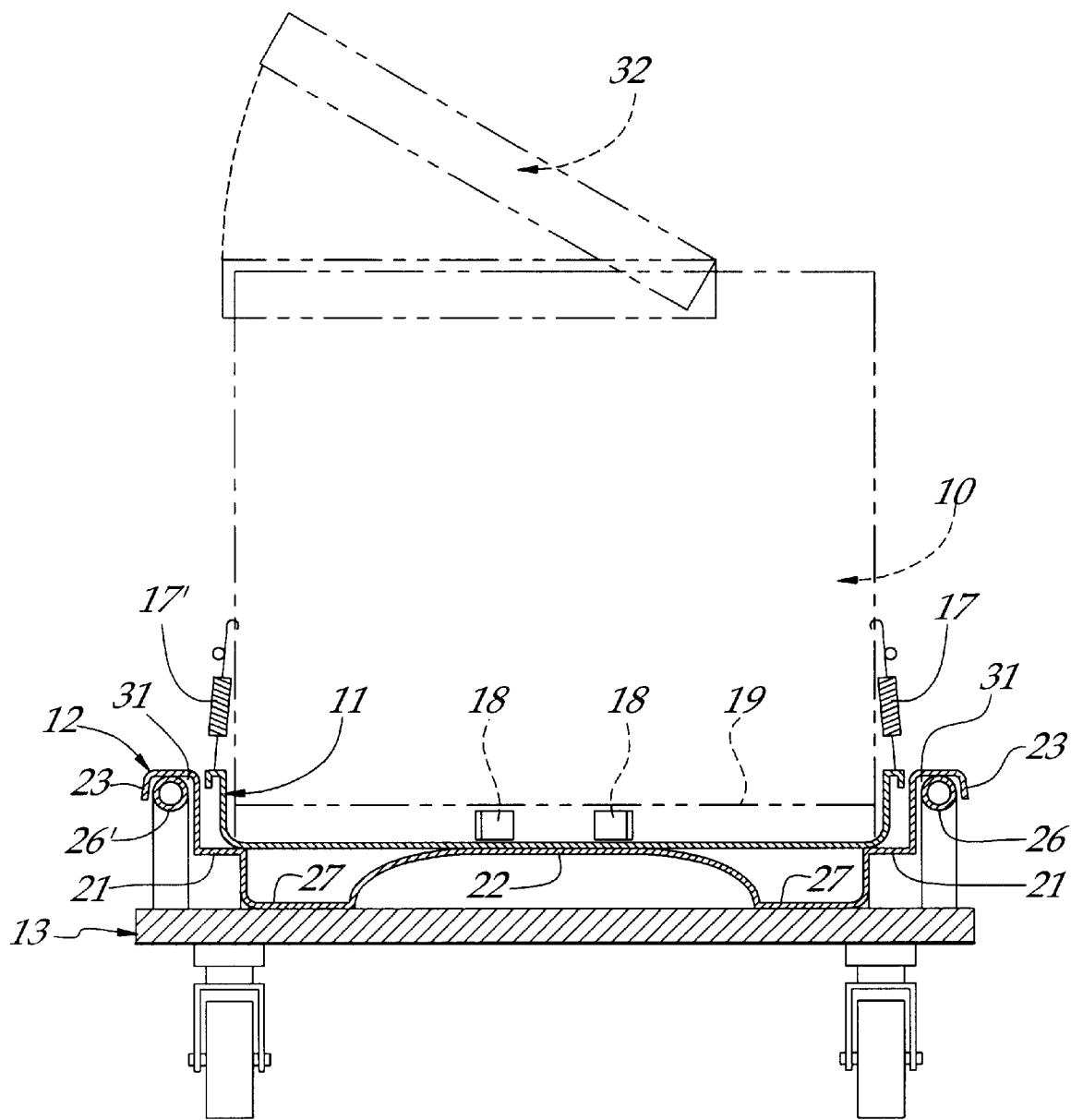
FIG. 2 is sectional view of the nested waste tray and pan with the cage in phantom.
Figure 3:
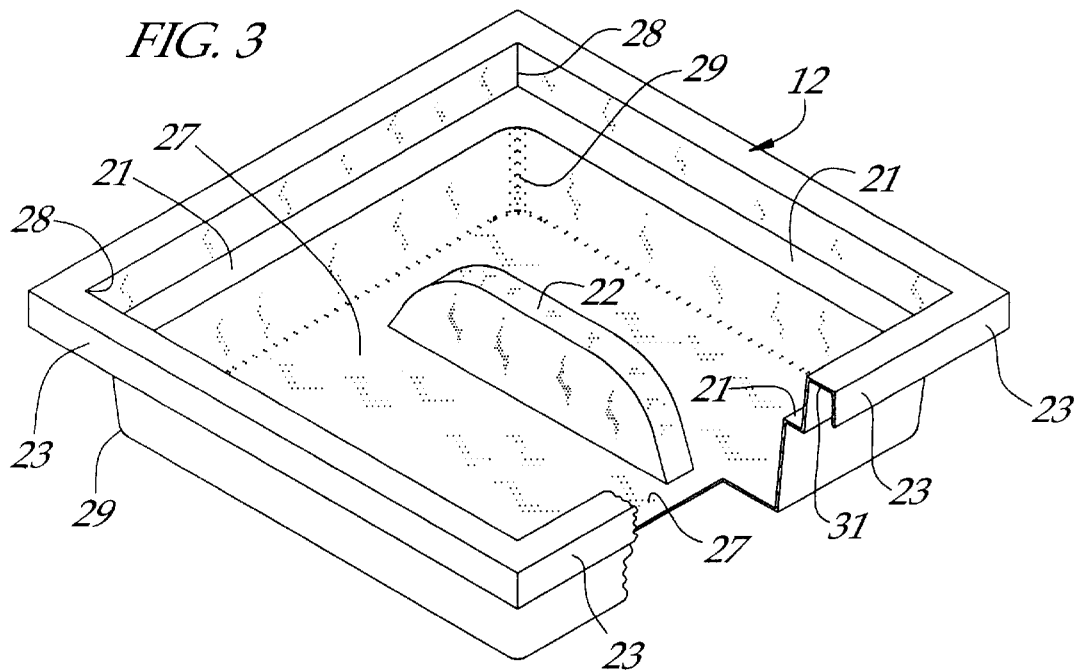
FIG. 3 is an expanded perspective view of the waste tray depicting its interior features.

Referring to FIGS. 2 and 3, the relationship of the nested pan and tray may be more clearly seen as well as the interior features of the waste tray 12. Using common injection molding techniques well known in the plastics industry, the tray and pan are formed with various features to facilitate the nested relationship. Waste tray 12 has an a floor 27 from which four upstanding walls extend at the periphery. The upstanding walls also extend outward slightly from the tray bottom 27, forming an oblique angle thereto and facilitating placement of pan-cage combination into the tray. A shoulder 21 extends continuously around the interior of the tray to support the pan-cage combination at approximately the mid point of the wall height. The comers 28 of the waste tray 12 above the internal shoulder 21 are generally square to improve the stability of the pan-cage combination once nested within the waste tray. Conversely, the comers 29 below the shoulder 21 are generally smooth and gradually curved to facilitate the cleaning of the lower portion of the waste tray 12. A central support stop 22 molded into to the center of the waste tray floor 27 assists in supporting the pan-cage combination and generally strengthens the waste tray floor 27. It is contemplated that multiple shoulders at various heights, possibly in a graduated fashion, may be molded into the interior walls so that different size waste pans may be accommodated by one size of waste tray.

Referring more closely to FIG. 3, the top most portion of the integrated walls form an upper peripheral edge. A lip 23 extends outwardly and downwardly defining an inner recessed contact area 31 for receiving the railing 26 or other support member extending upward from the dolly 13. The dolly railings 26,26' are appropriately positioned in relation to the dimensions of the waste tray 12 so that the tray may be rotated 90 degrees and remain fitted to the dolly 13. The diameter of the dolly rail 26 should conform to the diameter of the inner recessed area 31. However, a rail with a diameter smaller than the recess diameter will provide satisfactory results.

Figure 4:
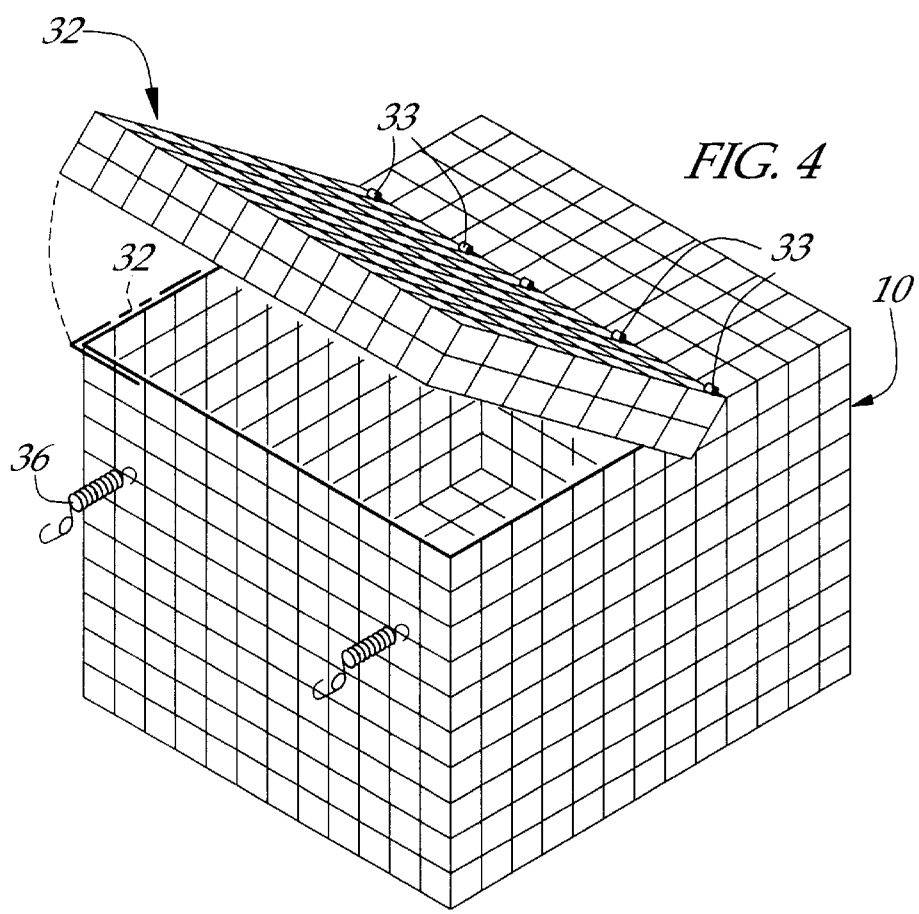
FIG. 4 is a perspective view of the movable rectilinear section on the cage in a closed and in an open position.
Figure 5:
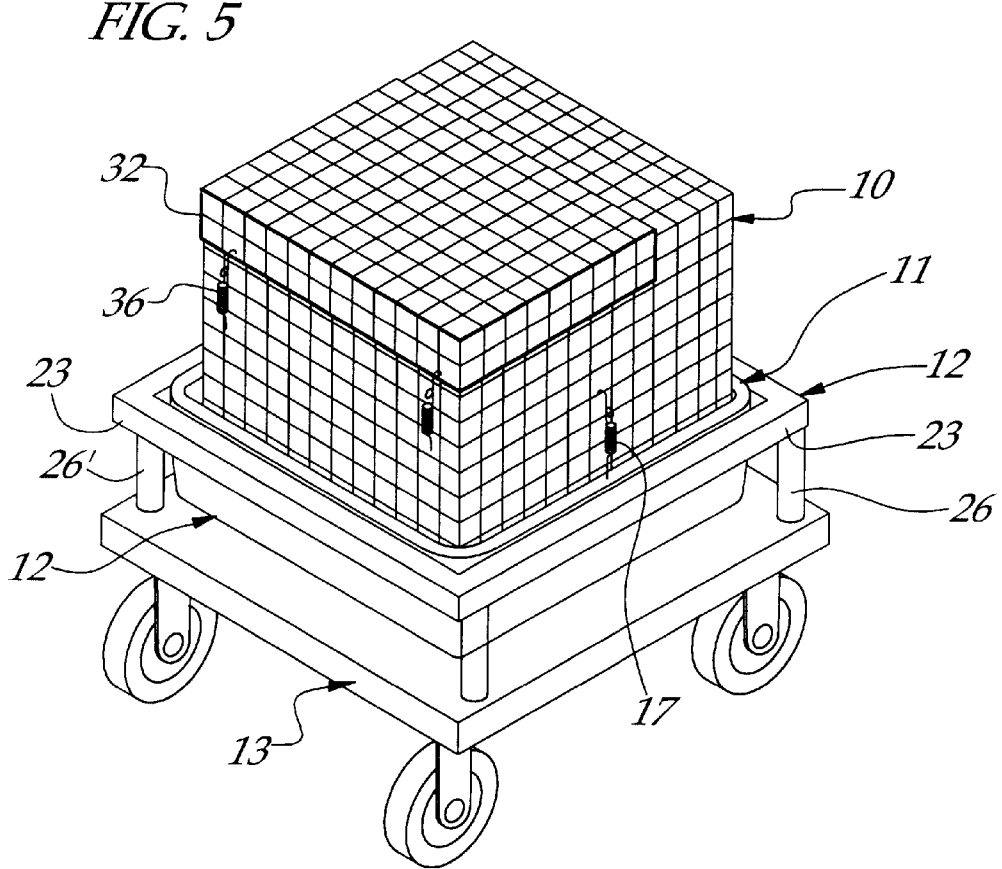
FIG. 5 is an environmental view of the assembled pet enclosure and waste tray; and, FIG. 6 is perspective view in section of a second embodiment of the invention having an integral waste pan and tray.
Figure 6:
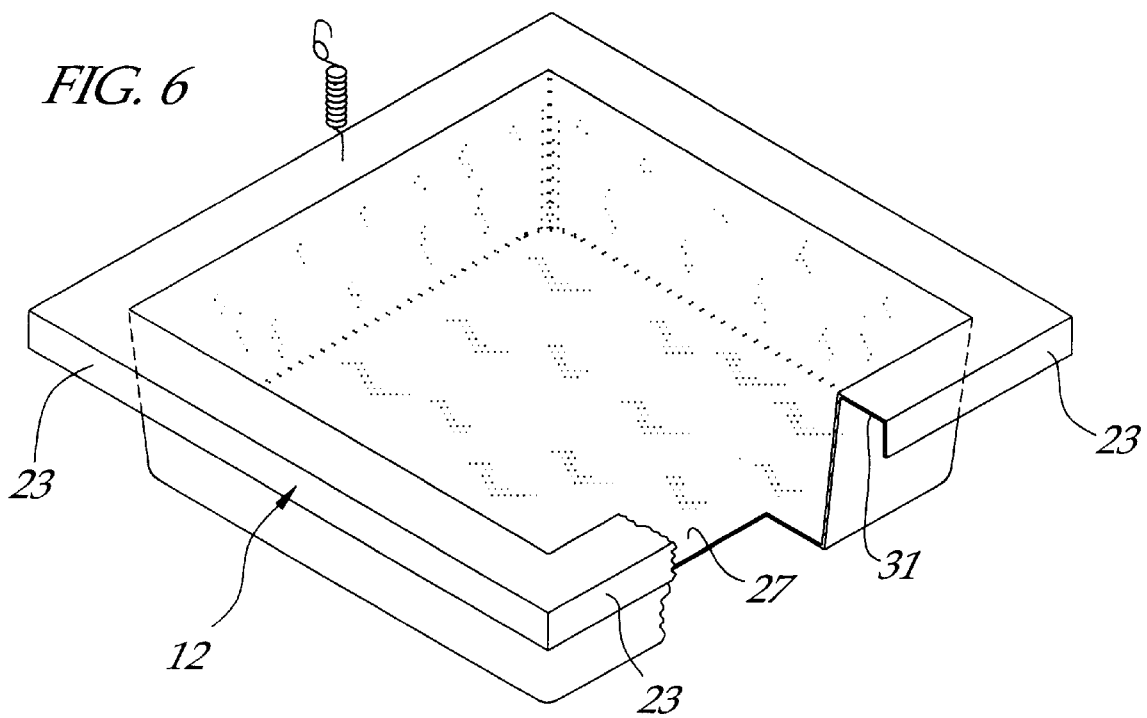

Referring to FIG. 4, it may be seen the cage 10 has a hinged rectilinear wire mesh section 32 capable of being swung up and away from the cage 10. Simple wire clasps 33 hold the wires on the periphery of the movable section 32 to the cage 10 wire while allowing rotation away from the cage. Movable section 32 has a skirt extending orthogonally downward from the periphery of the section 32 and which is cooperatively sized and positioned to overlap the comers and edges of the upper most point of the cage walls as shown. When the section 32 is moved to the closed position, the overlapping sections fit snugly over the cage walls to form an integrated cage. A spring 36 keeps the cage section securely closed. When the section 32 is moved to the open position, a large open area is created in the cage permitting the confined animal to be extracted or an animal to be placed into the enclosure while minimizing the change of injury to the animal or owner. Placement of interior devices for feeding and amusement are also facilitated by the large opening.

During a cleaning operation, the animal need not be removed from the cage. The pet owner simply disengages the side springs 17 from the waste pan 11 and removes the cage 10 from the waste pan 11 and waste tray 12 and sets the cage once again onto the tray without the waste pan attached. Loose particles can then be brushed from the wire cage 10 into the waste tray and the cage otherwise cleaned and feeding apparatuses refilled. While the cage is separated from the waste pan 11, the nesting material held in the pan 11 can be removed and the pan easily cleaned. Once the pan is clean, new nesting material may be reintroduced and the pan reattached to cage bottom with the side springs. The waste tray is then quickly rinsed off and pan-cage combination once again set into the waste tray and dolly.

A two part tray system allows the holding of the cage by either the pan or the tray while the other is cleaned. However, it is contemplated that a single integral piece having features of both components may be manufactured with satisfactory results. For example, the waste tray could be easily molded to form a waste pan section fitted to the bottom of the cage, while retaining the lip 23 at the periphery to engage the dolly railings 26 for registration therein. The depth of the interior shoulder 21 and height of the central support stop 22 could be varied to provide splash protection as with the upstanding walls of the waste pan 11 and central support for the cage as with the bracket 18. Apertures may be made in the lip 23 for connecting side springs between he cage and the waste tray to bias the integral tray against the cage.

While I have shown my invention in one form, it will be obvious to those skilled in the art that it is not so limited but is susceptible of various changes and modifications without departing from the spirit thereof.

Having set forth the nature of the present invention, what is claimed is:

1. In a portable wire animal enclosure, the improvements comprising:

a. a top forming a part of said enclosure having a portion thereof selectively movable to permit ingress and egress for an animal to be confined in said enclosure;

b. an imperforate bottom portion having a marginal lip dimensioned to receive said enclosure thereon and an upturned flange, circumscribing said enclosure, of sufficient height to prevent lateral discharge of waste from said enclosure; and c. means affixed to said enclosure for supporting the center thereof within said bottom portion.

2. In an animal enclosure as recited in claim 1, wherein said means to support said enclosure comprises a spacing bracket subjacently affixed to said enclosure.

3. In an animal enclosure as recited in claim 1, further including a waste tray comprising a bottom and four integral walls connected along an upper peripheral top edge, said walls extending upwardly and outwardly to said peripheral top edge, and wherein said walls include a continuous internal shoulder positioned between said bottom and said top peripheral edge and extending around an interior of said waste tray such that said imperforate bottom portion is supported by said internal shoulder in nested relation thereto.

4. In an animal enclosure as recited in claim 3, further including a dolly for supporting said waste tray in transportable relation thereto.

5. In an animal enclosure as recited in claim 4, wherein said dolly includes an upwardly extending support edge having a shape conforming to said peripheral top edge of said waste tray, and wherein said top peripheral edge further includes an outwardly and downwardly extending lip defining a recessed peripheral margin region underneath said top peripheral edge for receiving said support edge such that said waste tray is secured upon said dolly upon positioning thereon.

6. In an animal enclosure as recited in claim 5 further including biasing means for urging said imperforate bottom portion against said top comprising at least two springs positioned on opposite sides of said top, each said spring having one end connected to said imperforate bottom portion and another end connected to said top.

7. In an animal enclosure as recited in claim 5 wherein said waste tray has a generally smooth rounded surface where said walls intersect below said continuous internal shoulder for facilitating drainage of said waste tray when cleaning.

8. In an animal enclosure as recited in claim 7 wherein said waste tray has generally square inner corners above said continuous internal shoulder.

9. In an animal enclosure as recited in claim 1, a dolly for transporting said enclosure, said bottom portion fitting in registered retention on said dolly.

10. An animal confinement structure comprising:
   a. a rectilinear structure having vertical walls and an integral bottom extending between said walls, said bottom and said walls formed from interlaced strands defining a plurality of apertures of a size that a confined animal cannot pass therethrough;
   b. a top extending between said walls and having a portion thereof detachably affixed to said walls to permit ingress and egress of an animal relative to said confinement structure;
   c. a spacing bracket subjacently affixed to said bottom for supporting said confinement means at a selected height above a subjacent surface;
   d. a means for retaining waste and debris from said rectilinear structure dimensioned in accordance with said walls and said bottom of said rectilinear structure thereof to receive said bottom and a portion of said walls therewithin to prevent downward and lateral discharge of said waste and debris beyond said retaining means; and,
   e. a waste tray comprising a tray bottom and four integral tray walls connected along an upper peripheral top edge, said tray walls extending upwardly and outwardly to said peripheral top edge, and wherein said tray walls include a continuous internal shoulder positioned between a bottom peripheral edge and said top peripheral edge and extending around an interior of said waste tray such that said waste retaining means is supported by said internal shoulder in nested relation thereto.

11. An animal confinement structure as recited in claim 10, further including a dolly for supporting said waste tray in transportable relation thereto.

12. An animal confinement structure as recited in claim 11, wherein said dolly includes an upwardly extending support edge having a shape conforming to said peripheral top edge of said waste tray, and wherein said top peripheral edge further includes an outwardly and downwardly extending lip defining a recessed peripheral margin region underneath said top peripheral edge for receiving said support edge such that said waste tray is secured upon said dolly upon positioning thereon.

* * * * *